W. B. BARLEY AND J. C. CORBETT.
WATER COOLER.
APPLICATION FILED JAN. 31, 1920.

1,400,713.

Patented Dec. 20, 1921.
2 SHEETS—SHEET 1.

INVENTORS
William B. Barley and
James C. Corbett
BY Harold E. Stonebraker
their ATTORNEY.

W. B. BARLEY AND J. C. CORBETT.
WATER COOLER.
APPLICATION FILED JAN. 31, 1920.
1,400,713.
Patented Dec. 20, 1921.
2 SHEETS—SHEET 2.
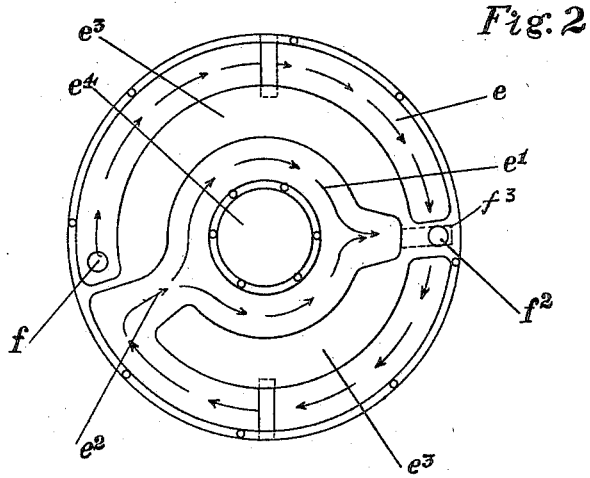
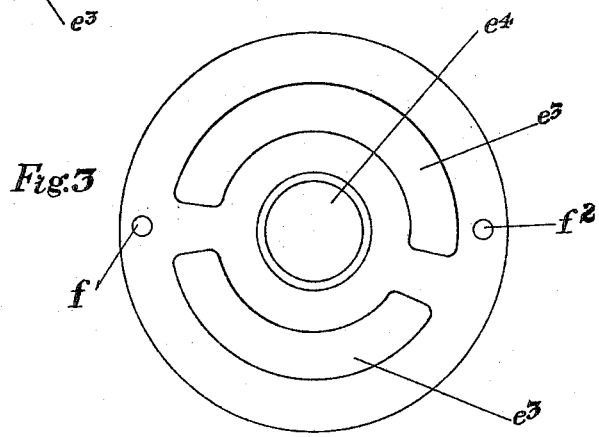
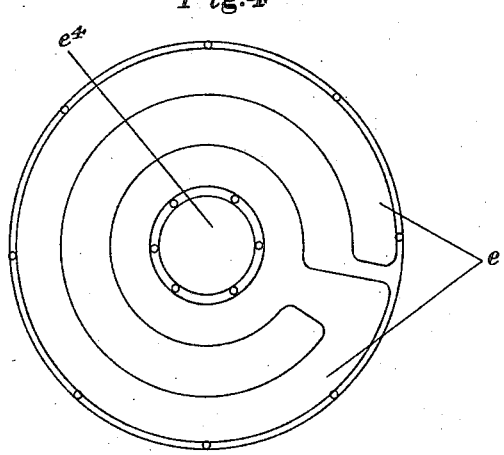

UNITED STATES PATENT OFFICE.

WILLIAM B. BARLEY AND JAMES C. CORBETT, OF ROCHESTER, NEW YORK, ASSIGNORS TO FEARLESS DISHWASHER COMPANY, INC., OF ROCHESTER, NEW YORK, A CORPORATION OF NEW YORK.

WATER-COOLER.

1,400,713.      Specification of Letters Patent.      Patented Dec. 20, 1921.

Application filed January 31, 1920. Serial No. 355,360.

*To all whom it may concern:*

Be it known that we, WILLIAM B. BARLEY and JAMES C. CORBETT, both citizens of the United States of America, residing at Rochester, in the county of Monroe and State of New York, have invented certain new and useful Improvements in Water-Coolers, of which the following is a specification.

The invention relates to improvements in water coolers, and it has for its chief object to afford a construction that is practical and economical to manufacture and operate, and is also sanitary to the greatest possible degree.

In a more particular aspect, the invention is intended to provide a conductor for the water to be cooled, the form of which is such as to permit of its being readily manufactured and assembled, and also to present a maximum cooling surface to the water traveling therethrough so as to have a maximum amount of cooled water available at all times.

An additional purpose of the invention is to utilize the waste cooled water by an arrangement that permits of feeding such waste water to the cooling compartment, where it assists in cooling the incoming water within the conductor.

The invention also consists in certain other improved features, all of which will appear from the following description, in conjunction with the accompanying drawings, the novel characteristics being pointed out in the claims at the end of the specification.

In the drawings:

Fig. 2 is a bottom plan view of the top section of the conductor;

Fig. 3 is a top plan view of the top section of the conductor, and

Fig. 4 is a plan view of the bottom section of the conductor.

Figure 1:
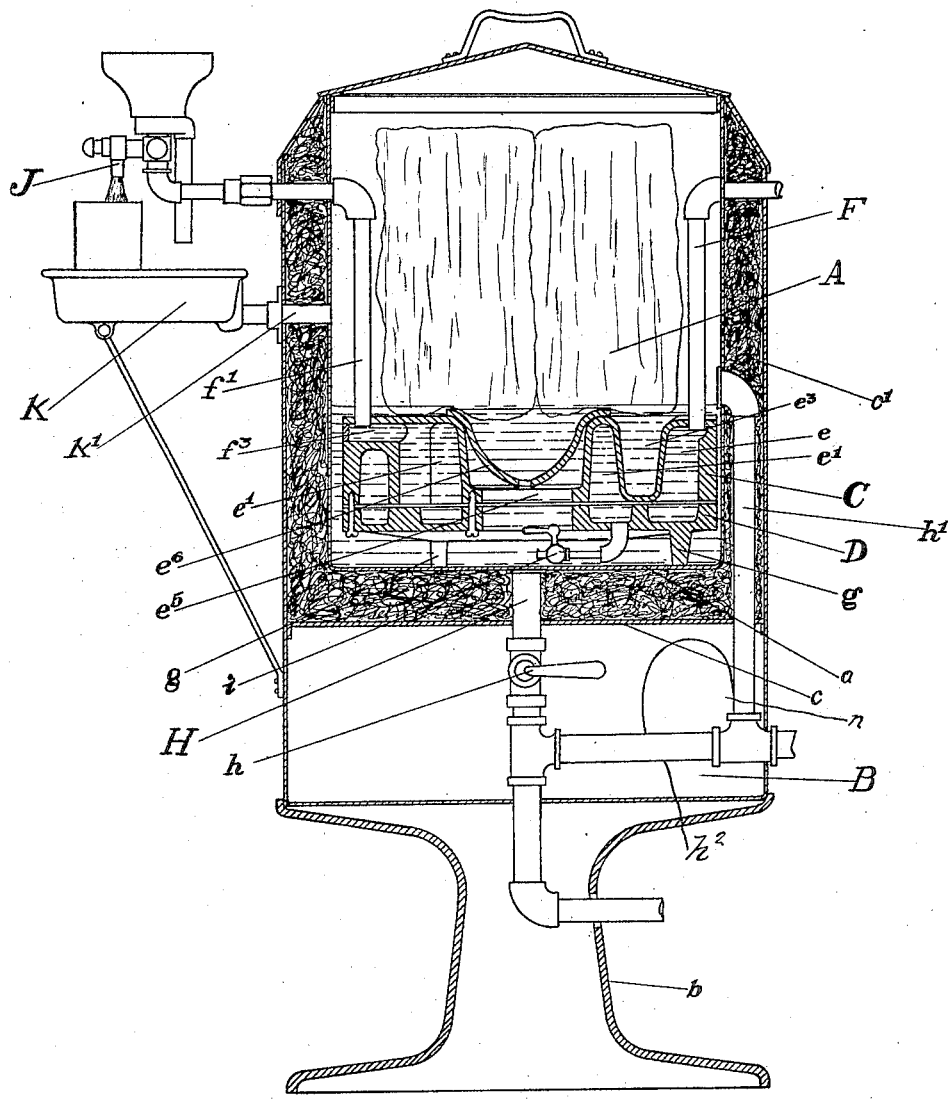
Figure 1 is a vertical sectional view illustrating a cooler embodying a preferred arrangement of the invention.

The particular construction now to be described is merely exemplary of possible arrangements by which the features of the invention can be adopted, and in no sense intended to limit the improvements to the details disclosed.

The structure shown comprises a cooling compartment A having a bottom $a$, all of which is arranged and supported within a casing B mounted on a base $b$. $c$ is a bottom wall located in spaced relation beneath the bottom $a$ of the cooling compartment, and arranged between the walls $a$ and $c$, and also between the compartment A and the casing B is any suitable insulating material, such for instance as charcoal, as designated by $c'$.

Disposed within the cooling compartment A is a conductor for the water to be cooled, such conductor being composed of a plurality of separable sections. In the arrangement shown, the conductor comprises an upper section designated generally by C, and a lower section designated generally by D. The section C is superposed and attached on the section D, said sections being conveniently cast and formed with recesses, which, when the sections are attached together, afford an outer passage $e$ and an inner passage $e'$ for the water to be cooled. The outer and inner passages $e$ and $e'$ are in communication with each other by a connecting passage $e^2$, as shown in Fig. 2. The upper section C is pocketed or recessed so as to afford the space $e^3$ surrounding the inner passage $e'$ and located between said inner passage and the outer passage $e$. The space or pocket $e^3$ is to admit the cooling water and bring it into contact with the adjacent side walls of the inner and outer passages of the conductor.

F designates an inlet pipe leading to any source of water supply, and preferably connected with the outer passage $e$ through the opening $f$, see Fig. 2, while $f'$ is an outlet pipe connecting with an opening $f^2$, see Fig. 2, said opening leading to a passage $f^3$ which communicates with the inner passage $e'$. The drinking water coming in through pipe F enters the outer passage $e$ and travels through a tortuous path, as indicated in Fig. 2, passing around the channel $e$, thence through the connecting passage $e^2$ to the inner channel $e'$, in which the flow of water is divided and passes around both sides of the interior wall $e^4$, see Fig. 2. Thus, the drinking water flows through the passage $f^3$ and into the outlet pipe $f''$.

The conductor for the drinking water is supported on feet $g$, in spaced relation to the bottom $a$ of the cooling compartment, and the cooling water is thus permitted to entirely surround the conductor for the drinking water, and also fill the recess or space $e^3$ between the inner and outer passages of the conductor. In this manner, the drinking water, while traveling over the tortuous path referred to, is subjected to a maximum cooling action. The conductor has a central opening $e^5$ which is surmounted by a metal shield or guard $e^6$, which serves to collect any foreign matter or sediment from the ice or cooling water. A block of ice can be supported upon the upper surface of the conductor, and the water melting therefrom flows down around the conductor through the central opening and around its outer sides.

H designates a drain pipe connecting with the bottom $a$ of the cooling compartment, and $h$ is a cut-off for the drain pipe, while $h'$ is an overflow pipe which leads from the cooling compartment above the bottom thereof to a horizontal pipe $h^2$ which connects with the drain pipe at a point below the cut-off $h$. $h^3$ designates an outlet leading from the drain pipe H. Thus, the cooling compartment becomes filled with cooling water as the ice is melted, until the rising water reaches the overflow pipe $h'$. The cut-off $h$ is normally closed when the cooler is in operation, and is opened only when it is desired to draw off the water within the cooling compartment, as for instance when putting in a fresh supply of ice. The conductor is provided with a discharge valve $i$ preferably located above the drain pipe H, and when it is desired to draw off the water within the conductor, or to cleanse it, the valve $i$ can be opened. An opening $n$ is provided in the casing B, to permit access to cut-off $h$.

The drinking water, after passing through the outlet pipe $f'$, travels to the water discharge J, which may be of usual construction, and controlled by a suitable hand valve. Arranged beneath the discharge J is a drain receptacle $k$ to receive the overflow or waste drinking water, and $k'$ is a pipe leading from the drain receptacle to the cooling compartment H. By this arrangement, the waste drinking water, which is already cooled, is carried back to the cooling compartment, where it mixes with the cooling water, and assists materially in cooling the incoming drinking water within the conductor. The result of this arrangement is to utilize to a maximum degree all of the cooling units of the ice, and to afford a continuous maximum supply of cooled drinking water.

It is to be understood that the invention is not confined to any or all of the precise details set forth, and is susceptible of various modifications and departures which nevertheless come within the underlying features of the improvements and the scope of the claims which follow.

We claim:

1. A conductor for water coolers comprising a plurality of separable sections, each of said sections having recesses therein which coöperate to form a tortuous passage for the water and affording outer and inner communicating passages for successively receiving the water to be cooled, the conductor having a central recess extending entirely therethrough to receive the cooling medium, and one of said sections having a recess extending from the top to the bottom thereof and entirely surrounding the inner passage and acting to receive the cooling medium between the inner and outer passages.

2. A conductor for water coolers having outer and inner communicating passages for successively receiving the water to be cooled, and spaces surrounding the inner passage and separating the outer and inner passages for admitting the cooling water.

3. A conductor for water coolers having a central opening surrounded by an inner passage for the water to be cooled, the conductor also including an outer passage for the water to be cooled communicating with the inner passage, and a recess surrounding the inner passage and separating said passages to admit the cooling water.

4. A water cooler comprising a cooling compartment, a conductor for the water to be cooled, said conductor being located within the compartment, a drain pipe connecting with the bottom of the cooling compartment, and a discharge valve for said conductor located in proximity to said drain pipe, and adapted to empty therein.

5. A water cooler comprising a cooling compartment, a conductor for the water to be cooled, said conductor being located within the compartment, means for maintaining cooling water in said compartment at a level above said conductor, a water discharge, a pipe leading from said conductor to the water discharge, a drain receptacle located under the water discharge, and a pipe leading from the drain receptacle to said cooling compartment.

6. A water cooler comprising a cooling compartment, means for maintaining a predetermined level of cooling water therein, a drain receptacle, and a pipe leading from the drain receptacle to the cooling compartment.

In witness whereof, we hereunto sign our names.

WILLIAM B. BARLEY.
JAMES C. CORBETT.